(12) United States Patent
Spengler et al.

(10) Patent No.: US 11,577,352 B2
(45) Date of Patent: Feb. 14, 2023

(54) FASTENING DEVICE AND SYSTEM

(71) Applicant: FESTOOL GMBH, Wendlingen (DE)

(72) Inventors: Wolfgang Spengler, Neidlingen (DE); Jonathan Weik, Filderstadt (DE)

(73) Assignee: Festool GmbH, Wendlingen (DE)

( * ) Notice: Subject to any disclaimer, the term of this patent is extended or adjusted under 35 U.S.C. 154(b) by 0 days.

(21) Appl. No.: 17/438,181

(22) PCT Filed: Mar. 10, 2020

(86) PCT No.: PCT/EP2020/056314
§ 371 (c)(1),
(2) Date: Sep. 10, 2021

(87) PCT Pub. No.: WO2020/182796
PCT Pub. Date: Sep. 17, 2020

(65) Prior Publication Data
US 2022/0088734 A1    Mar. 24, 2022

(30) Foreign Application Priority Data
Mar. 12, 2019   (DE) ..................... 10 2019 203 355.5

(51) Int. Cl.
*B23Q 9/00* (2006.01)
*B23D 47/02* (2006.01)
(Continued)

(52) U.S. Cl.
CPC .......... *B23Q 9/0042* (2013.01); *B23D 47/02* (2013.01); *B23D 51/02* (2013.01); *B23D 59/001* (2013.01); *B23D 59/006* (2013.01); *B23D 59/007* (2013.01)

(58) Field of Classification Search
CPC ...... B23Q 9/0042; B23D 47/02; B23D 51/02; B23D 59/001; B23D 59/006; B23D 59/007
See application file for complete search history.

(56) References Cited

U.S. PATENT DOCUMENTS

| 6,158,666 A | 12/2000 | Banks et al. |
| 2002/0043599 A1 | 4/2002 | Pando |

(Continued)

FOREIGN PATENT DOCUMENTS

| DE | 20 2006 001 691 | 7/2006 |
| DE | 10 2005 009 315 | 8/2006 |

(Continued)

OTHER PUBLICATIONS

Examination Report issued in German Patent Application No. 10 2019 203 355.5, dated Feb. 3, 2020, 8 pages.

(Continued)

*Primary Examiner* — Brian W Jennison
(74) *Attorney, Agent, or Firm* — Hamre, Schumann, Mueller & Larson, P.C.

(57) ABSTRACT

A functional unit, in particular for a tool, a tool accessory and/or a lighting apparatus, that includes a housing, a suction region, which is arranged on the housing and with which the fastening apparatus can be fastened releasably to a substrate, and an electrically operated negative-pressure unit, which is arranged in the housing and to provide a negative pressure in the suction region. The fastening apparatus also includes at least one fastening interface for fastening the functional unit. Alternatively, or additionally, the fastening apparatus includes the functional unit. The functional unit includes a guide device, in particular a guide rail, a router guide, a routing template, a rolling guide rail, a drilling apparatus, a lamp and/or a grazing light.

23 Claims, 11 Drawing Sheets

(51) Int. Cl.
 B23D 51/02 (2006.01)
 B23D 59/00 (2006.01)

(56) References Cited

U.S. PATENT DOCUMENTS

| | | | | |
|---|---|---|---|---|
| 2002/0168241 | A1* | 11/2002 | David | B23Q 11/0046 409/178 |
| 2004/0093682 | A1* | 5/2004 | Litomisky | A47L 9/2857 15/314 |
| 2006/0231705 | A1* | 10/2006 | Liu | F16B 47/00 248/205.5 |
| 2008/0181733 | A1* | 7/2008 | Wright | B23Q 9/0042 408/1 R |
| 2013/0270757 | A1* | 10/2013 | Thibaut | B23Q 1/03 269/21 |
| 2015/0003927 | A1 | 1/2015 | Spishak et al. | |
| 2016/0256972 | A1* | 9/2016 | Reid | B64F 5/10 |
| 2017/0292559 | A1* | 10/2017 | Liu | G08B 5/22 |
| 2018/0036849 | A1 | 2/2018 | Smith | |

FOREIGN PATENT DOCUMENTS

| | | |
|---|---|---|
| DE | 20 2013 1 04 555 | 12/2013 |
| DE | 20 2014 101 724 | 6/2014 |
| DE | 202 07 381 | 9/2020 |
| EP | 2 140 970 | 1/2010 |
| EP | 2 628 427 | 8/2013 |

OTHER PUBLICATIONS

International Search Report issued in International Application No. PCT/EP2020/056314, dated Jun. 26, 2020, 5 pages w/translation.
Written Opinion issued in International Application No. PCT/EP2020/056314, dated Jun. 26, 2020, 6 pages.
Third Party Observations filed in corresponding European Patent Application No. 20710497.7, May 10, 2022,125 pages.

* cited by examiner

FASTENING DEVICE AND SYSTEM

The invention relates to a fastening device for a function unit. The function unit is for example a tool, a tool accessory and/or an illumination device.

BACKGROUND OF THE INVENTION

The fastening device in particular serves for fastening the function unit to a workpiece in a releasable manner. Concerning the function unit, it is preferably a guide device, in particular a guide rail. The guide device for example serves for guiding an electrical tool, in particular saw, relative to the workpiece.

US 2018/0036849 A1 describes a cutting device. A rail, on which a cutting tool can be guided, is fastened to a control plate via two rotatably mounted support elements. A beam, to which a suction cup is attached, is fastened to a first support element which extends upwards perpendicularly from the control plate.

SUMMARY OF THE INVENTION

It is the object of the invention to provide a fastening device which is better to handle.

This object is achieved by the fastening device according to claim 1. According to the invention, a fastening device for a function unit, in particular for a tool, a tool accessory and/or an illumination device is provided. The actuation device comprises housing, a suction region which is arranged on the housing at the outside and with which the fastening device can be releasably fastened to an underlay, and an electrically operated vacuum unit which is arranged in the housing and which is designed to provide a vacuum in the suction region. The fastening device furthermore comprises at least one fastening interface for fastening the function unit. Alternatively or additionally to the fastening interface, the fastening device comprises the function unit. The function unit comprises a guide device, in particular a guide rail, a router guide, a milling template, a roll guide rail, a drilling device, a lamp and/or a strip light.

Due to the fact that the fastening device comprises an electrically operated vacuum unit, the provision of the vacuum in the suction region—and thus the fastening of the fastening device to the underlay—can be carried out in a more comfortable and reliable manner than this is usually possible with a suction cup. As a result, the handling ability can be improved.

Advantageous further developments are the subject-matter of the dependent claims.

BRIEF DESCRIPTION OF THE DRAWINGS

Further details and preferred embodiments are explained hereinafter with reference to the figures, Herein are shown in.

DETAILED DESCRIPTION OF THE INVENTION

With regard to the subsequent explanations, the spatial directions "x-direction, "y-direction" and "z-direction" which are aligned orthogonally to one another, are referred to. A differentiation between a positive and a negative direction is not made.

Figure 1:
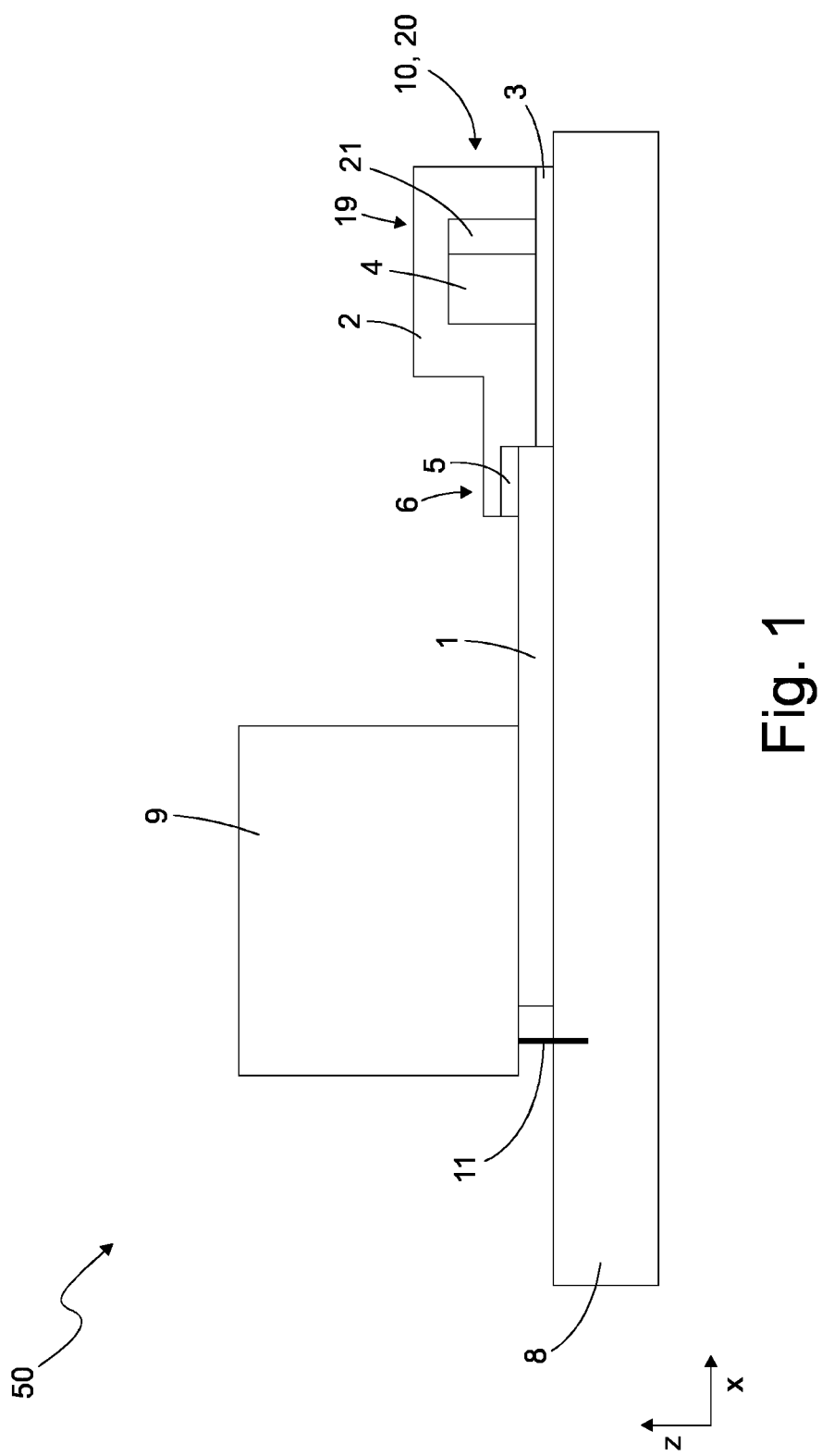
FIG. 1 an arrangement of a fastening device, a function unit, an underlay and a tool, FIG. 2 a fastening device, FIG. 3 an arrangement of a fastening device and a guide rail, FIG. 4 an arrangement of a fastening device with a removable fastening section and with a guide rail, FIG. 5 an arrangement of a fastening device and a guide rail, wherein the guide rail is attached to a first fastening interface, FIG. 6 an arrangement of a fastening device and a guide rail, wherein the guide rail is attached to a second fastening interface, FIG. 7 a sectional representation of an arrangement of a fastening device and of a guide rail, FIG. 8 an enlarged detail of the sectioned representation of FIG. 7, FIG. 9 a sectioned representation of a section of a fastening device which comprises a sensor and a sealing and/or lay-on arrangement, FIG. 10 a view from below upon a fastening device with a section region which comprises several suction sections, FIG. 11 a view from below upon a fastening device with an inner and with an outer sealing section according to a first variant, FIG. 12 a view from below upon a fastening device with an inner and with an outer sealing section according to a second variant, FIG. 13 a view from below upon a fastening device with several suction regions which are arranged on different sides, FIG. 14 a view from above upon the fastening device with the several suction regions, FIG. 15 a fastening device with several fastening units.

FIG. 1 shows an arrangement 50 of a fastening device 10, of a function unit 1, of an underlay and of a tool 9.

The arrangement 50 represents an exemplary environment of application for the fastening device 10. Expediently, the fastening device 10 can also be provided per se.

The fastening device 10 serves for fastening the function unit 1. By way of example, the function unit 1 is a tool accessory, in particular a guide device, such as for example a guide rail.

The fastening device 10 comprises a housing 2 and a suction region 3 which is arranged on the housing 2 at the outside and with which the fastening device 10 can be releasably fastened to the underlay. The fastening device 10 further comprises an electrically operated vacuum unit 4 which is arranged in the housing 2 and which is designed to provide a vacuum in the suction region 3. The fastening device 10 further comprises a fastening interface 5 for fastening the function unit 1.

Hereinafter, further exemplary details are explained.

Firstly to the basic construction of the arrangement 50:

As already mentioned, the function unit 1 is preferably designed as a guide device, in particular as a guide rail. Alternatively, the function unit 1 can also be a tool, (another) tool accessory, and/or an illumination device. In particular, the function unit 1 can be designed as an upper milling guide, routing template, roll guide rail, drilling device, lamp and/or strip light.

The function unit 1 which is designed as a guide device defines a guide path, along which a tool 9 can be guided. By way of example, the guide path runs in the y-direction—thus normally to the plane of the drawing of FIG. 1. By way of example, the guide device comprises a guide structure, for example a guide groove and/or a guide projection which defines the guide path, and along which guide structure the tool 9 can be reliably guided. Herein, the tool 9 is expediently in engagement with the guide device in a manner such that the movement degree of freedom of the tool 9 is blocked in a direction, by way of example in the x-direction, which is different to the direction of the guide path.

The guide device is expediently designed in a strip-like manner. The guide device with its side which is largest with regard to surface area is aligned normally to the z-direction. The upwardly directed side of the guide device is hereinafter also denoted as a guide device upper side and the downwardly directed side as a guide device lower side. The tool 9 is laid upon the guide device upper side. The guide device lies with the guide device lower side on the underlay 8.

The tool 9 is preferably an electric tool, in particular a hand-held electric tool. By way of example, the tool 9 is a saw with a saw blade 11. The saw blade 11 is arranged next to the function unit 1 in the x-direction and runs from the housing of the tool 9 to the underlay 8. The saw blade plane of the saw blade 11 is aligned normally to the x-direction. Alternatively, the tool 9 can also be designed as a miller.

The underlay 8 is expediently a workpiece which is to be machined by the tool 9. As is shown in FIG. 1, the saw blade 11 saws into the underlay 8. According to an alternative embodiment, the underlay 8 comprises a lay-on section which is not to be machined by the tool 9. Furthermore, the underlay 8 as a whole can also be designed as a lay-on section—for example as a lay-on table—which is not to be machined. For example, the x-section of the underlay 8, on which the fastening device 10 and/or the function unit 1 lies, can partly or completely be a lay-on section, in particular a lay-on table. The workpiece to be machined by way of example would then be applied onto the lay-on section in the x-direction, so that in a state in which the tool 9 is placed upon the function unit 1, the workpiece can be machined by the tool 9.

The fastening device 10 is hereinafter to be dealt with in more detail.

The fastening device 10 comprises the housing 2 which is expediently the outer housing of the fastening device 10. In the orientation of the fastening device 10 which is shown in FIG. 1, the suction region 3 is situated on the lower side of the housing 2. The fastening device 10 lies with the suction region 3 on the underlay 8.

The fastening device 10 comprises a main section 19 and a fastening section 6. The housing 2, in particular the main section 19 is preferably manufactured from plastic, magnesium and/or aluminium. The main section 19 by way of example has a cuboid basic shape. The main section 19 comprises a front side which faces the function unit 1 and a rear side which is aligned oppositely to the front side. The front side and/or the rear side are expediently aligned normally to the x-direction. The main section 19 furthermore comprises a first transverse side and a second transverse side which is aligned oppositely to this, said transverse sides being expediently directed normally to the y-direction. Furthermore, the main section 19 comprises an upper side and a lower side which is aligned oppositely to this and which is aligned normally to the z-direction.

Starting from the front side of the main section 19, the fastening section 6 extends in the x-direction. The fastening section 6 by way of example is designed in a flat manner. In particular, the fastening section 6 is designed in a plate-like or strip-like manner. In particular, the fastening section 6 is a projection 6 which extends in the x-direction. Preferably, the fastening section 6 with its side which is greatest in surface area is aligned normally to the z-direction. The fastening section 6 is arranged in a region of the fastening device 1 which is at the bottom in the z-direction.

In particular, the fastening device 10 can be attached to the guide rail in a tool-free manner. In particular, the attachment is effected by way of an L-shaped slot nut 12 which can be suspended into a fastening groove 22 of the guide rail. The slot nut 12 can also be described as a protrusion.

The fastening section 6 is situated at least partly above the function unit 1 which is designed as a guide device, in particular above the guide device upper side, in the z-direction. The fastening section 6 at least partly assumes the same x-region as the function unit 1. Expediently, the lower side of the fastening section 6 lies on the upper side of the function unit 1. The function unit 1 is expediently fixed relative to the underlay 8 in the z-direction via the fastening section 6. In particular, the function unit 1 is clamped between the fastening section 6 and the upper side of the underlay 8. The fastening interface 5 which is expediently in engagement with the function unit 1, in particular with a fastening structure of the function unit 1, is situated on the fastening section 6, in particular on its lower side.

In a state in which the fastening device 10 is fastened to the underlay 8, the fastening device 10 is therefore designed to hold, in particular clamp the function unit 1 in a position in which the function unit is applied on the underlay 8.

The fastening device 10 is fastened to the upper side of the underlay 8 via the vacuum which is provided in the suction region 3. In particular, the fastening device 10 is expediently fixed relative to the underlay 8 in all spatial directions via the vacuum which is provided in the suction region 3.

According to an alternative embodiment which is not shown in the figures, the function unit 1 is an integral part of the fastening device 10 and in particular cannot be removed from the fastening device 10. With regard to this alternative embodiment, the fastening device 10 expediently has no fastening section 6 and/or no fastening interface 5.

The suction region 3 extends in the x-direction and/or y-direction over a large part, thus over more than half the lower side of the main section 19, in particular the lower side of the fastening device 10. Preferably, the x-extension and/or the y-extension of the suction region 3 is larger than the z-extension of the main section 19, in particular of the fastening device 10. The ratio of the x-extension of the suction region 3 to the y-extension of the suction region is between 1.5 to 1 and 3.5 to 1, expediently between 2 to 1 and 3 to 1. This ratio is preferably 2 to 1 or 3 to 1.

The suction region 3 is arranged next to the function unit 1 in the x-direction. By way of example, the suction region 3 and the lower side of the function unit 1 are aligned in the same direction—by way of example the z-direction—and in particular lie in the same x-y plane.

The electrically operated vacuum unit 4 is arranged in the housing 2, in particular in the main section 19. The electrically operated vacuum unit 4 is preferably an electrical vacuum pump. The electrically operated vacuum unit 4 can further be a piston pump, a lamellae pump and/or a turbine.

Expediently, furthermore an energy store 21 is arranged in the housing 2, in particular in the main section 19. The energy store 21 is for example a battery. The energy store 21 expediently provides the complete electrical energy which is necessary for the operation of the fastening device 10, in particular the vacuum unit 4. The energy store 21 expediently comprises several battery cells which are arranged in the housing. Alternatively or additionally, the fastening device can also comprise an energy store interface which in particular is arranged on the housing at the outside and which serves for the attachment of an external energy store, for example an exchangeable battery.

The energy store 21 is expediently charged by way of an external mains part which can be connected to the fastening device 10 via an electrical connection, for example a standard round plug interface. The fastening device 10 expediently comprises a visual display which in particular is visible from outside the housing and which displays the charged state of the energy store 21. Furthermore, the fastening device 10 can comprise an acoustic signal emitter which as a reaction to the charged state of the energy store 21 falling short of a threshold value outputs an acoustic warning signal which can be perceived by a user, expediently before the vacuum unit 4 is deactivated on account of a charged state of the energy store 21 being too low.

The unit of the housing 2, vacuum unit 4, suction region 3 and fastening interface 5 can also be expediently denoted as a fastening unit 20.

On operation, the function unit 1 which is designed as a guide device, is firstly positioned on the upper side of the underlay 8. The fastening device then with its suction region 3 is placed on the upper side of the underlay 8. When placing the fastening device 10 on the upper side of the underlay 8, expediently the fastening interface 5 is simultaneously placed on the upper side of the function unit 1, in particular is brought into engagement with this. By way of example, the fastening interface 5 is oriented in the same direction—here the z-direction—as the suction region 3, so that by way of one and the same lay-on movement of the fastening device 10 which is effected in the z-direction, the suction region 3 can be laid onto the upper side of the underlay 8 and the fastening interface 5 simultaneously onto the upper side of the function unit 1. The fastening device 10 is preferably freely positionable in the y-direction before and/or after the laying-on on the underlay 8. In particular, the fastening device 10 is positionable in the y-direction at an arbitrary y-position within the y-extension of the function unit 1.

The electrically operated vacuum unit 4 is activated, for example by a user actuation, after the laying of the fastening device 10 on the underlay 8 and the function unit 1. A vacuum, in particular a pressure, which is lower than the atmospheric pressure is now provided in the suction region 3. On account of the provision of this vacuum, the fastening device 10 is sucked with its suction region 3 onto the upper side of the underlay 8, so that the fastening device 10 is fixed relative to the underlay 8 in all spatial directions. From now on, the function unit 1 is also fixed relative to the underlay 8, in particular in the z-direction and/or x-direction and/or y-direction, via the engagement of the function unit 1 with the fastening interface 5.

The fastening interface 5 optionally comprises a fastening mechanism which is yet explained in more detail hereinafter and which can be activated by a user actuation, in order to provide and/or reinforce the fixation of the function unit 1 relative to the fastening interface 5 in at least one spatial direction, in particular the y-direction.

Preferably, the function unit 1 is fixed to the fastening interface 5 in the z-direction and/or x-direction by way of a positive fit and/or is fixed to the fastening interface 5 in the y-direction by way of a frictional connection.

Alternatively to the procedural manner which has been explained above and with regard to which it is firstly the vacuum unit 4 which is activated and only afterwards the (optionally present) fastening mechanism, the fastening mechanism can also be activated firstly and only then the vacuum unit 4. With regard to the latter procedural manner, the fastening device 10 is firstly fastened to the function unit 1, so that the fastening device 10 and the function unit 1 (before activation of the vacuum unit 4) can be expediently moved together relative to the underlay 8, in particular in one or more horizontal directions. The fastening device 10 is then fastened to the underlay 8 by way of activating the vacuum unit 4

The function unit 1 is fixed relative to the underlay 8, in particular in all spatial directions, by way of the fastening to the fastening device 10. The tool 9 is now placed upon the function unit 1 and is moved along a guide path which is defined by the function unit 1, in order to machine the underlay 8, in particular a workpiece, with the tool 9. Herein, a machining of the upper side of the underlay 8 is effected in particular in the same x-y plane, in which the lower side of the function unit 1 and/or of the suction region 3 lie.

For removing the function unit 1, the vacuum unit 4 (in particular by way of user actuation) can be deactivated, so that the suction region 3 is vented. Venting means supplying air. Inasmuch as it is present, the fastening mechanism can further be released (in particular by way of user actuation). The fastening device 10 can then be removed from the underlay 8 and from the function unit 1. Furthermore, the function unit 1 can be removed from the underlay 8.

Thus, by way of the fastening device 10, in particular a (by way of user actuation) releasable connection between the fastening device 10 and the underlay 8 and between the fastening device 10 and the function unit 1 can be provided.

Figure 2:
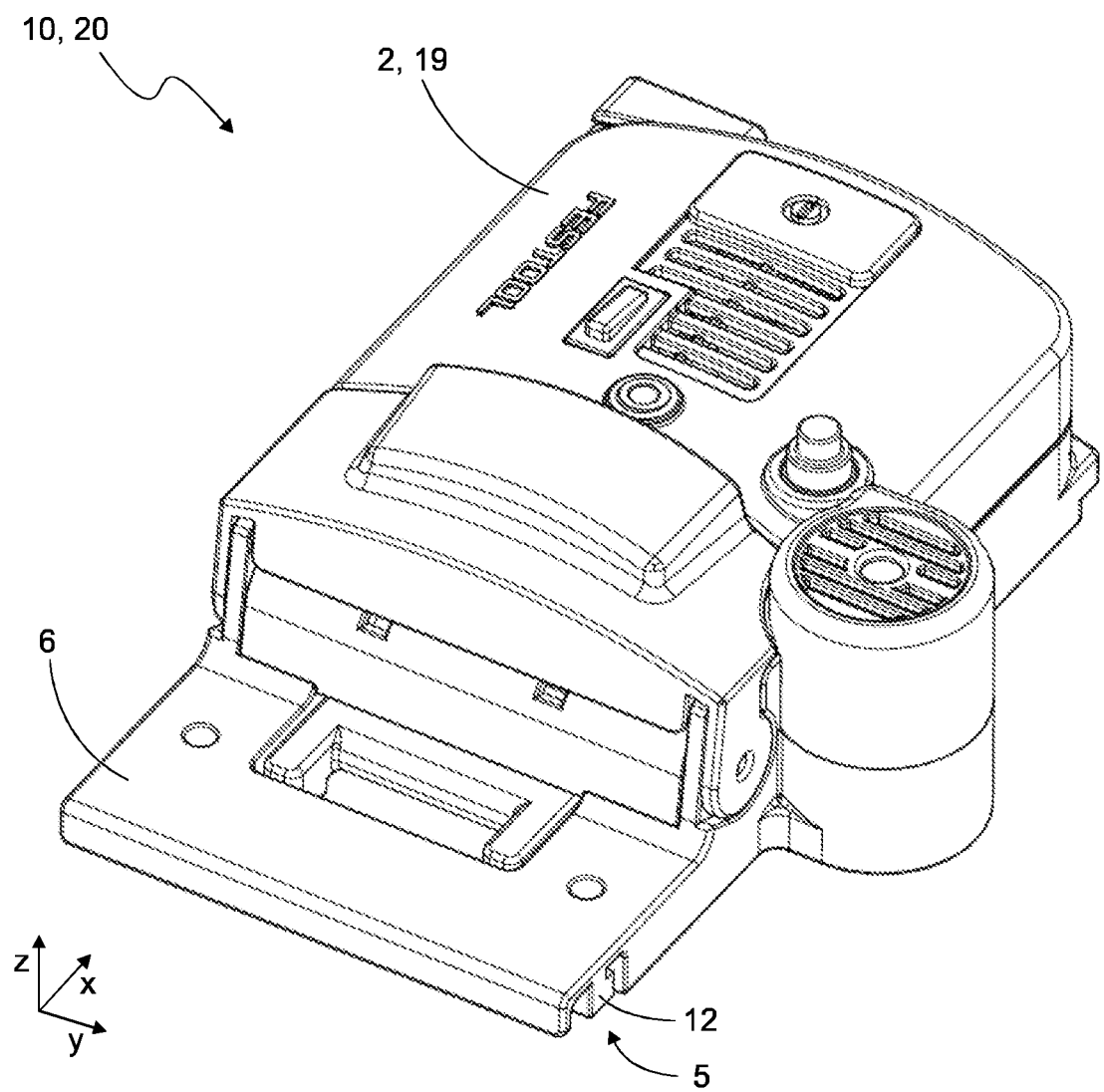

FIG. 2 shows a possible design of the fastening device 10. The fastening interface 5 for the function unit 1 here comprises a slot nut 12 which extends in the y-direction. The slot nut 12 by way of example has an L-profile. The slot nut 12 is attached to the lower side of the fastening section 6.

Figure 3:
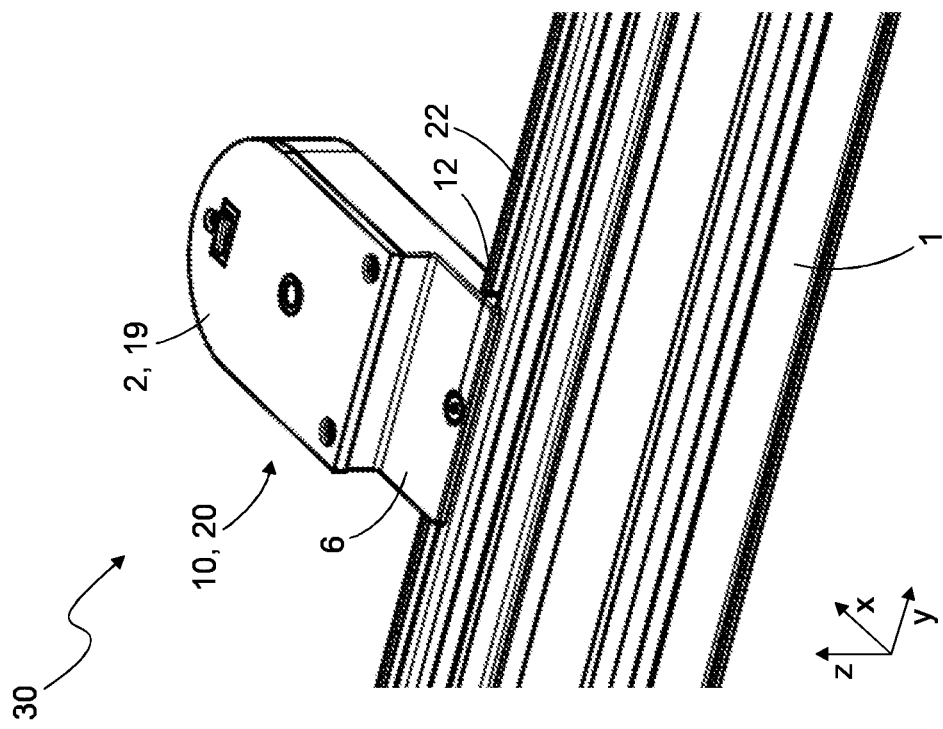

FIG. 3 shows an arrangement of a function unit 1 which is designed as a guide device, in particular a guide rail, and of a fastening device 10.

The function unit 1 comprises a fastening groove 22, into which the slot nut 12 of the fastening device 10 is inserted. The fastening groove 22 by way of example extends in the y-direction and is preferably arranged on the upper side of the function unit 1.

The fastening section 6 here is expediently connected to the main section 19 in a fixed, in particular non-releasable, manner. In particular, the fastening section 6 is designed as one piece with the housing 2—thus as an integral constituent of the housing 2.

Figure 4:
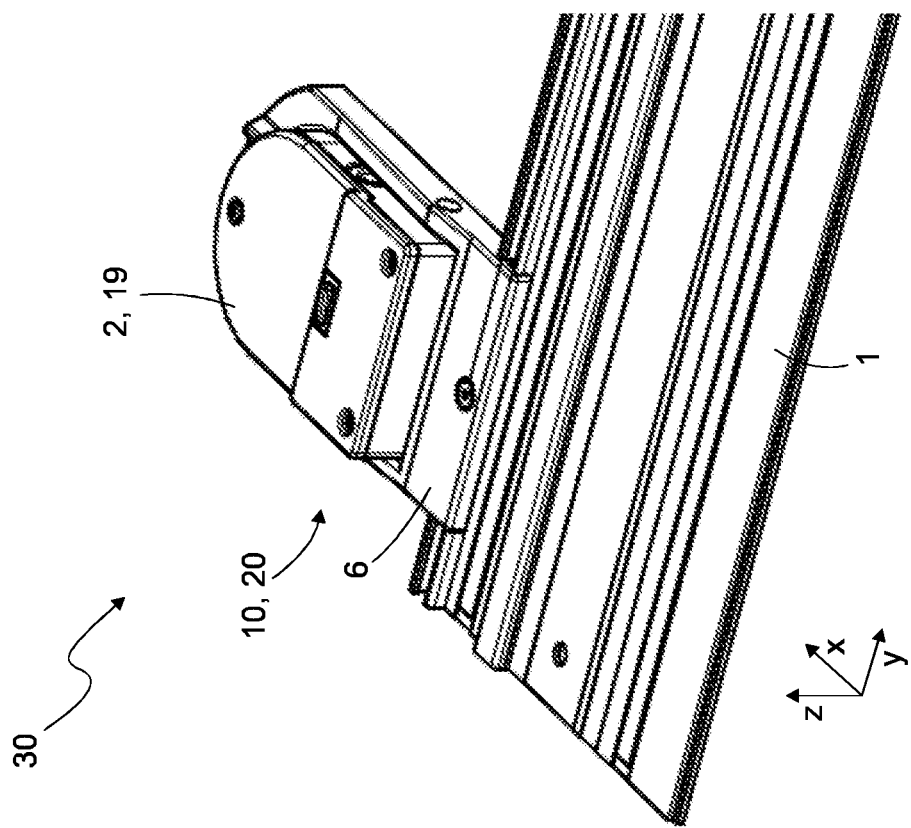

FIG. 4 shows an alternative embodiment of the fastening device 10, concerning which the fastening section 6 is attached to the main section 19 in a removable manner. According to an embodiment (which is not shown in the figures) at least two different fastening sections 6 are provided, which can be attached to the main section 19 alternatively to one another.

By way of example, the fastening section 6 has a frame-like basic shape, in whose middle an opening is present, into which opening the main section 19 can be inserted.

Figure 5:
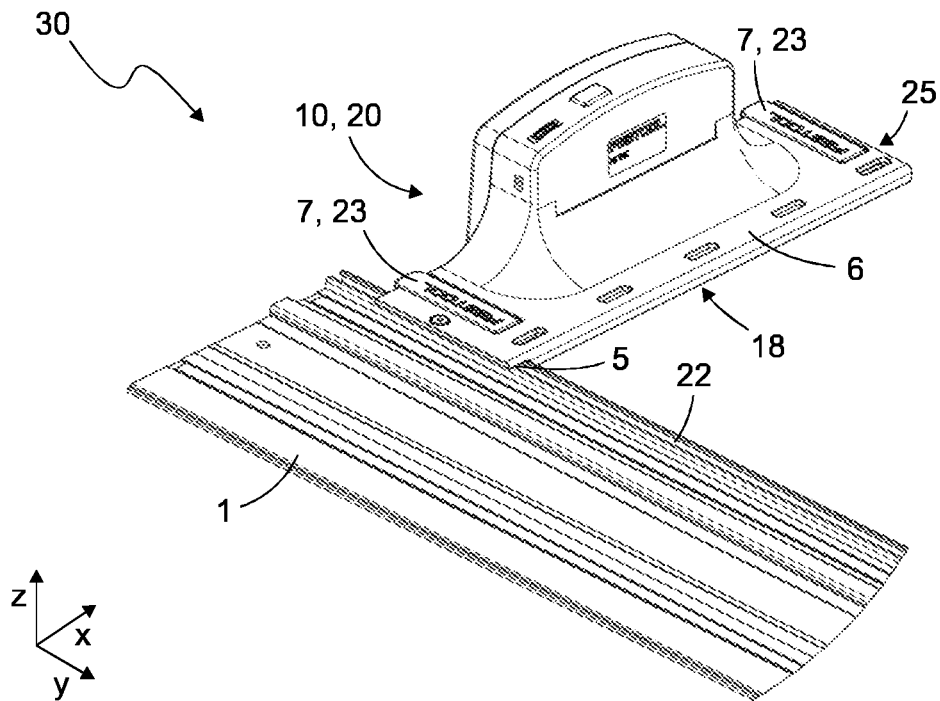
Figure 6:
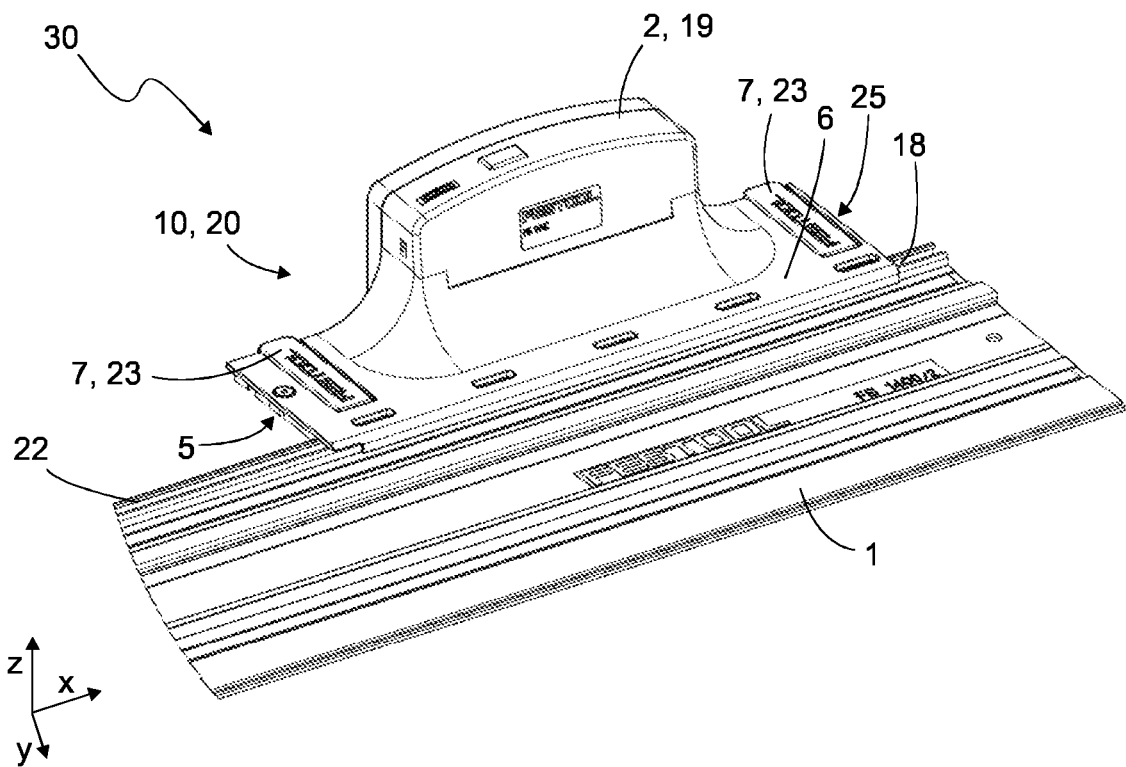

FIGS. 5 and 6 show an embodiment of the fastening device 10, where the fastening device 10 comprises several fastening interfaces 5, 18, 25.

In particular, the fastening device 10 of this embodiment comprises a first fastening interface 5 and a second fastening interface 18. Optionally, the fastening device 10 further comprises a third fastening interface 25. The two fastening interfaces 5, 18, in particular all fastening interfaces 5, 18, 25, are arranged on different sides of the fastening device 10. By way of example, the first fastening interface 5 is arranged on the front side of the fastening device 10, the second fastening interface 18 is arranged on a transverse side of the fastening device 10 and/or the third fastening interface 25 is arranged on the rear side of the fastening device 10.

The first fastening interface 5 and/or the third fastening interface 25 are expediently aligned with their longitudinal axes in the y-direction. The second fastening interface 25 is aligned with its longitudinal axis in the x-direction.

Each of the fastening interfaces 5, 18, 25 expediently has its own slot nut which can be brought into engagement with the fastening groove 22. The slot nut of the first fastening interface 5 is aligned orthogonally to the slot nut of the second fastening interface 18.

The second fastening interface 18, in particular its slot nut, expediently has an x-extension which is at least thrice as large as the y-extension of the first fastening interface 5 and/or of the third fastening interface 25.

By way of example, one, plural or all of the fastening interfaces 5, 18, 25 serve for alternative attachment of the function unit 1, in particular of a guide rail. The function unit 1 can expediently be attached selectively to the first fastening interface 5, to the second fastening interface 18 or to the third fastening interface 25. In FIG. 5, the function unit 1 is attached to the first fastening interface 5. The function unit 1 here is aligned with its longitudinal axis in the y-direction. In FIG. 6, the function unit 1 (alternatively to this) is attached to the second fastening interface 18. The function unit 1 here is aligned with its longitudinal axis in the x-direction.

The fastening interfaces 5, 18, 25 are arranged on the fastening section 6 which here by way of example is designed as a plate-like section with a C-shaped outline. The fastening section 6 surrounds the main section 19 at three sides. The main section 19 extends beyond the upper side of the fastening section 6 in the z-direction. The main section 19 has a cuboid basic shape which with its longitudinal axis is aligned parallel to the y-direction. The transitions between the vertical sides of the main section 19 and the upper side of the fastening section 6 by way of example are designed in a rounded manner.

Preferably, an arrangement (not shown in the figures) is provided, said arrangement comprising the fastening device 10 and two function units 1, in particular two guide rails, wherein the fastening device 10 comprises at least two fastening interfaces 5, 18, 25 and each function unit 1 is attached to a different one of the fastening interfaces 5, 18, 25.

The fastening device 10 by way of example comprises a fastening mechanism 7, via which one or more fastening interfaces 5, 18, 25 can be fixedly clamped to the function unit 1.

The fastening mechanism 7 expediently comprises an operating element 23 as well as a fastening element (not shown in the figures). By way of actuating the operating element 23, the fastening element is brought into a fastening position, in which it presses against a fastening structure of the function unit 1, so that the function unit 1 is fixedly clamped to the fastening interface of the fastening device 10. For example, by way of actuating the operating element 23, a fastening element which is designed as a bracket is tightened against the guide rail via a curved path. Herein the bracket flexes, by which means certain tolerance compensation can be provided Furthermore, the flexing ensures that a biasing force is exerted upon the guide rail.

By way of example, the operating element 23 is designed as a lever which is arranged on the upper side of the fastening section 6. The operating element 23 is pivotably mounted about a horizontal axis. Expediently, two operating elements 23 are present. The fastening mechanism 7, in particular the operating element, expediently comprises a toggle lever, an eccentric and/or a rotation lever.

According to a possible embodiment, different fastening mechanisms are each present for the first fastening interface 5 and for the second fastening interface 18. By way of example, the fastening mechanism of the first fastening interface 5 comprises a slot nut and/or the fastening mechanism of the second fastening interface comprises a toggle lever.

According to a further possible embodiment, the third fastening interface 25 is not present.

Figure 7:
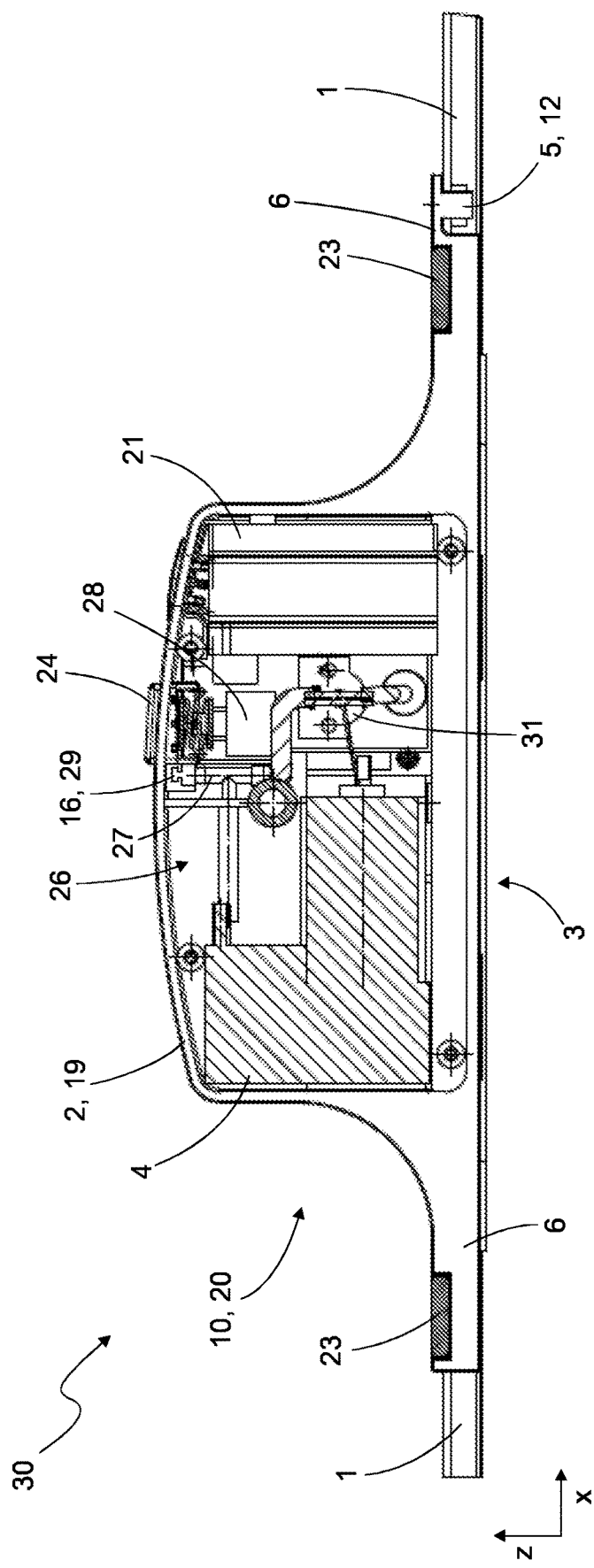
Figure 8:
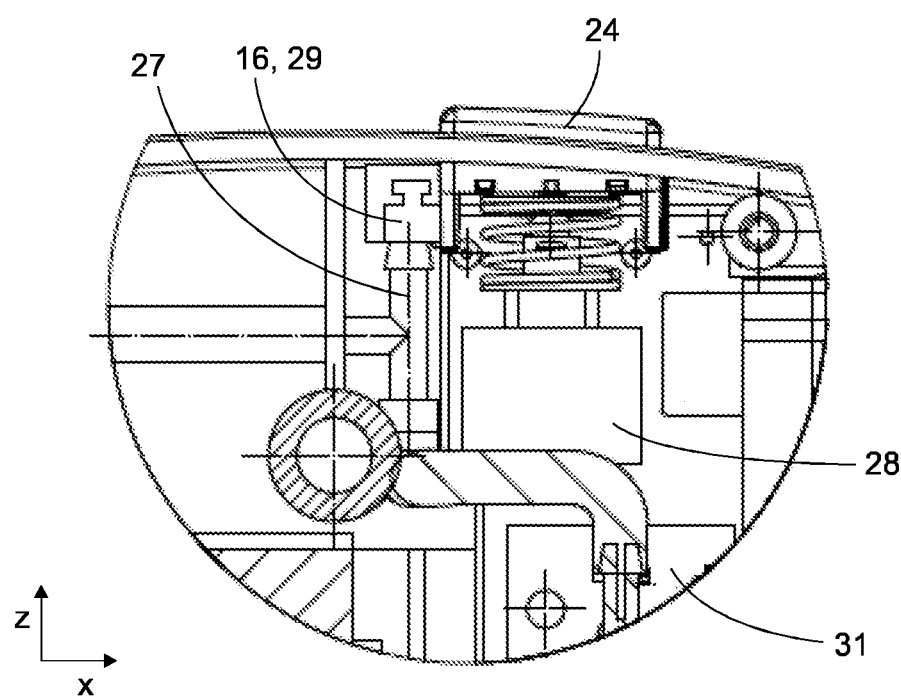

FIG. 7 shows an x-z section through the fastening device 10, in particular through the main section. An enlarged detail of the section of FIG. 7 is shown in FIG. 8.

A housing interior 26 which by way of example is designed in a cuboid manner and in which several components of the fastening device 10 are arranged, in particular the electrically operated vacuum unit 4 and the energy store 21, is situated in the inside of the housing 2.

The fastening device 10 comprises an operating element 24 which by way of example is arranged on the upper side of the main section 19. The operating element 24 is expediently designed as a button and in particular serves for deactivating the electrically operated vacuum unit 4, so that this no longer provides the vacuum in the suction region 3. Alternatively or additionally, the operating element 24 serves for opening a venting valve 16, via which the suction region 3 is vented. Expediently, the deactivation, in particular a switching-off, of the electrically operated vacuum unit 4 as well as the opening of the venting valve 16 can be effected simultaneously with one and the same user actuation of the operating element 24, for example a downward pressing upon the operating element 24. The deactivation of the vacuum unit 4 is herein expediently effected electrically and the opening of the venting valve 16 is expediently effected in a purely mechanical manner. In particular, the operating element 24 is coupled (purely) mechanically onto the venting valve 16, so that on actuation of the operating element 14 an opening of the venting valve 16 by the (purely) mechanical coupling is effected.

By way of example, the venting valve 16 comprises a valve member 29, by way of example a sealing element, which closes an opening of a fluidic conduit 27 which leads to the suction region 3. By way of an actuation of the operating element 24, one can cause the valve member 29 to release the opening of the fluidic conduit 27, by which means the suction region 3 can be vented via the fluidic conduit 27.

The operating element 24 is further coupled to the electrical switching device 28, for example to a control unit, in particular to a microcontroller. On actuating the operating element 24, the vacuum unit 4 is deactivated, in particular switched off, via the electrical switching device 28.

The vacuum unit 4 by way of example is designed as a vacuum pump and generates a vacuum in the suction region 3 which suction region 3 is located between the fastening device 10 and the underlay 8. The vacuum unit 4 is fluidically connected to the suction region 3 via a fluidic conduit, for example a tube. The fluidic conduit 27 for the venting valve 16 is likewise arranged in the housing 2. By way of the venting valve 16, one can ensure that the fastening device 10 can be detached from the underlay 8 directly after the switching-off of the vacuum pump.

According to a possible embodiment, the electrically operated vacuum unit 4 is designed to provide two vacuum circuits. In this manner, one can provide for example two vacuums which are independent of one another.

The fastening device 10 is expediently further designed to carry out a closed-loop control of the vacuum which is provided by the vacuum unit 4. In particular, the fastening device 10 is designed to closed-loop control the vacuum to a predefined target pressure. By way of example, the fastening device 10 comprises a pressure sensor 31, via which an actual pressure value of the vacuum is detected and is preferably taken into account for the closed-loop control.

Preferably, the fastening device 10 is designed to detect an error state and, on the basis of the detection of the error state, to provide an error signal, in particular an error signal which can be perceived by the user. For example, the fastening device 10 is designed to detect that the vacuum which is provided in the suction region 3 exceeds a predefined threshold value and to provide the error signal, for example as an acoustic warning signal, on the basis of this detection. The vacuum is a negative pressure.

Figure 9:
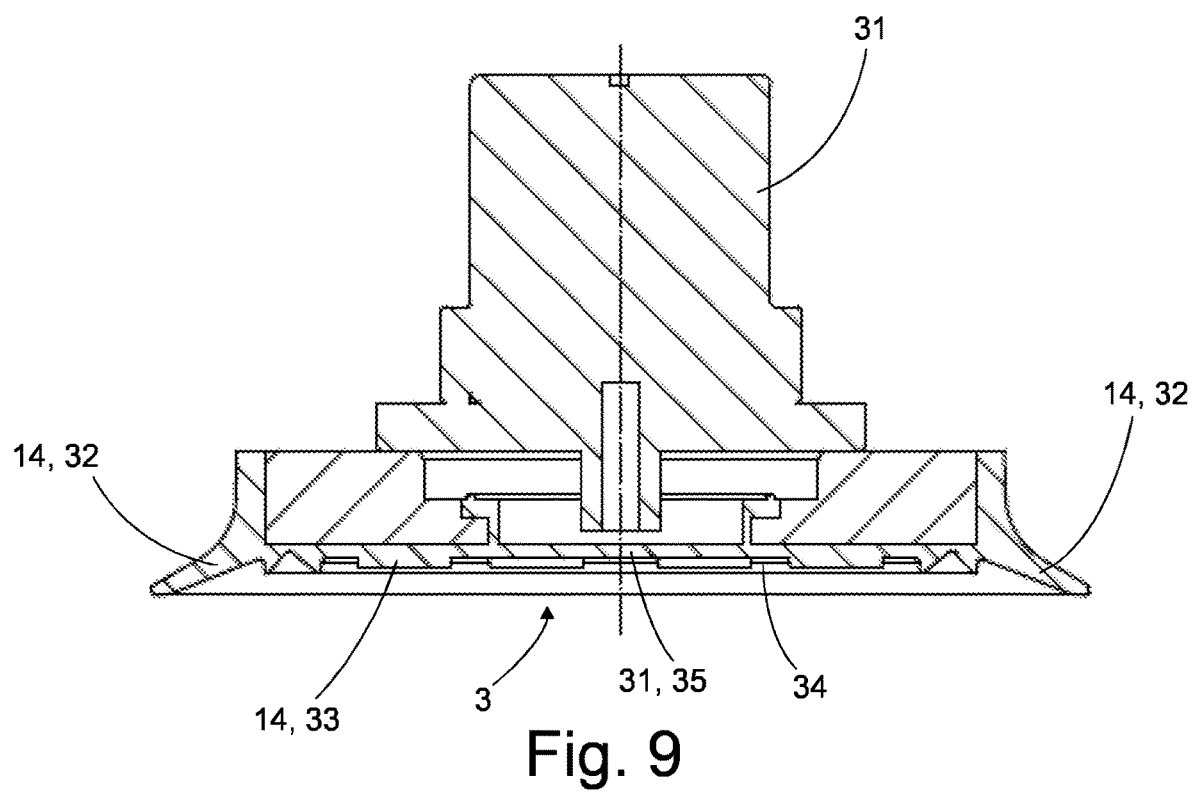

FIG. 9 shows a lower part-region of the fastening device 10, comprising a sealing and/or lay-on arrangement 14. The part-region by way of example further comprises a pressure sensor 31.

The sealing and/or lay-on arrangement 14 by way of example comprises a sealing section 32 which is arranged on the lower side of the fastening device 10 and runs around the suction region 3, so that the suction region 3 in a state, in which the fastening device is laid on the underlay 8, is sealed with respect to the surroundings, in particular with respect to the atmosphere.

The sealing and/or lay-on arrangement 14 furthermore by way of example comprises a lay-on section 33 which within the suction region 3 forms the lower side of the fastening device 10. The sealing section 32 expediently runs around the lay-on section 32. In a state, in which the fastening device 10 is laid on the underlay 8 and the vacuum unit 4 is activated, the fastening device 10 expediently lies with the sealing section 32 and the lay-on section 33 on the underlay 8. In a state, in which the fastening device 10 is laid on the underlay 8 and the vacuum unit 4 is deactivated, the fastening device 10 expediently lies with the sealing section 32 (and not with the lay-on section 33) on the underlay 8.

The sealing and/or lay-on arrangement 14 is designed by way of example bowl-shaped, wherein the sealing section 32 forms the edge region of the bowl shape and the lay-on section the base region of the bowl shape.

The fastening device 10 comprises a suction side, on which the suction region 3 is provided. By way of example, the suction side is the lower side of the lay-on section 33. The suction side defines a first lay-on plane—specifically that lay-on plane, with which the fastening device 10 lies on the underlay 8 when the vacuum unit 4 is activated.

The sealing and/or lay-on arrangement defines a second lay-on plane for the laying-on of the underlay 8. The second lay-on plane by way of example is defined by the sealing section 32. The second lay-on plane is that lay-on plane, with which the fastening devices 10 lies on the underlay 8 when the vacuum unit 4 is deactivated.

The second lay-on plane is angled with respect to the first lay-on plane—thus with respect to the suction side. In particular, the second lay-on plane is pivoted about a horizontal axis—in particular about the y-axis—with respect to the first lay-on plane.

As long as no vacuum is provided in the suction region 3, the fastening device 10 lies with the sealing section 32 (and not with the lay-on section 33), thus in particular with the second lay-on plane, on the underlay 8. The first lay-on plane which is defined by the lay-on section 33 is aligned in a manner pivoted about a horizontal pivot axis with respect to the underlay 8. By way of the provision a vacuum in the suction region 3, the fastening device 10 sucks itself with the lay-on section 33 onto the underlay 8. Herein, a pivoting movement of the fastening device 10 relative to the underlay 8 takes place on account of the angle between the two lay-on planes.

According to an exemplary embodiment, the sealing and/or lay-on arrangement 14, in particular the lay-on section 33 comprises a pressure sensor membrane 35 of the pressure sensor 31. The pressure sensor 31 by way of example detects a deflection of the pressure sensor membrane and on the basis of this provides a pressure signal with respect to the pressure which prevails in the suction region 3. The pressure sensor member 35 in particular is a central section of the lay-on section 33. Expediently, the pressure sensor membrane 35 is integrated into the lay-on section 3 and in particular is designed as one piece with this.

By way of example, a plurality of deepenings 34 are provided in the lay-on section 33, said deepenings not contacting the underlay 8 on laying the lay-on section 33 on the underlay 8. Expediently, the surface area share of the surface regions of the lay-on section 33 which contact the underlay 8 is at least 50% of the total surface area of the lower side of the lay-on section 33.

According to the shown embodiment, the sealing and/or lay-on arrangement 14 is designed as one piece. In particular, the sealing section 32 and the lay-on section 33 are connected to one another with a material fit. The sealing and/or lay-on arrangement 14 is injected onto the housing 2 for example at the bottom 2.

Alternatively or additionally to this, the sealing and/or lay-on arrangement 14 and/or an individual part and/or a section thereof, for example the sealing section 32 and/or the lay-on section 33 can be designed to be exchangeable, in particularly individually exchangeable.

Figure 10:
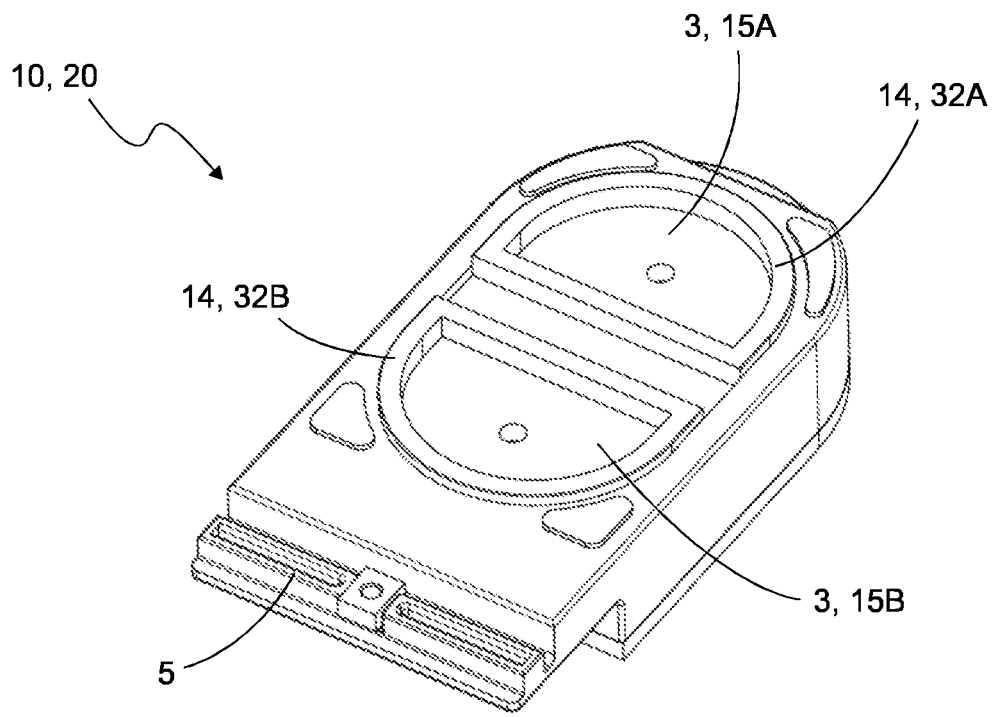

FIG. 10 shows the fastening device 10 from below. By way of example, the suction region 3 here comprises two separate suction sections 15A, 15B. Each suction section 15A, 15B expediently belongs to a respective vacuum circulation. Each suction section 15A, 15B by way of example is sealed with respect to the surroundings by way of an individual sealing section 32A, 32B (in a state in which the fastening device 10 lies on the underlay 8.). The two guide sections 32A, 32B by way of example each have a semicircular course.

Figure 11:
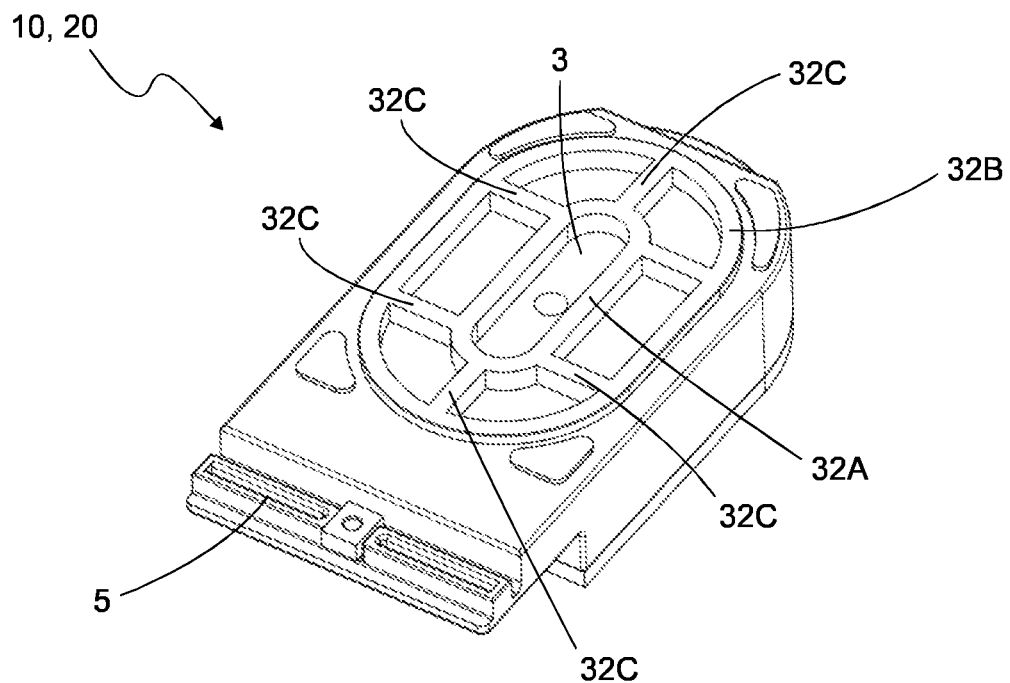

FIG. 11 shows an alternative embodiment of the lower side of the fastening device 10. The fastening device here comprises a first sealing section 32A which surrounds the suction region 3, and additionally to this a second sealing section 32B which surrounds the first sealing section 32A Both sealing sections 32A, 32B by way of example have an elliptical course. Expediently, the two sealing sections 32A, 32B are connected to one another via a plurality of web-like third sealing sections 32C. The sealing structure which is formed from the first, second and/or third sealing sections 32A, 32B, 32C can also be denoted as a segment seal.

Figure 12:
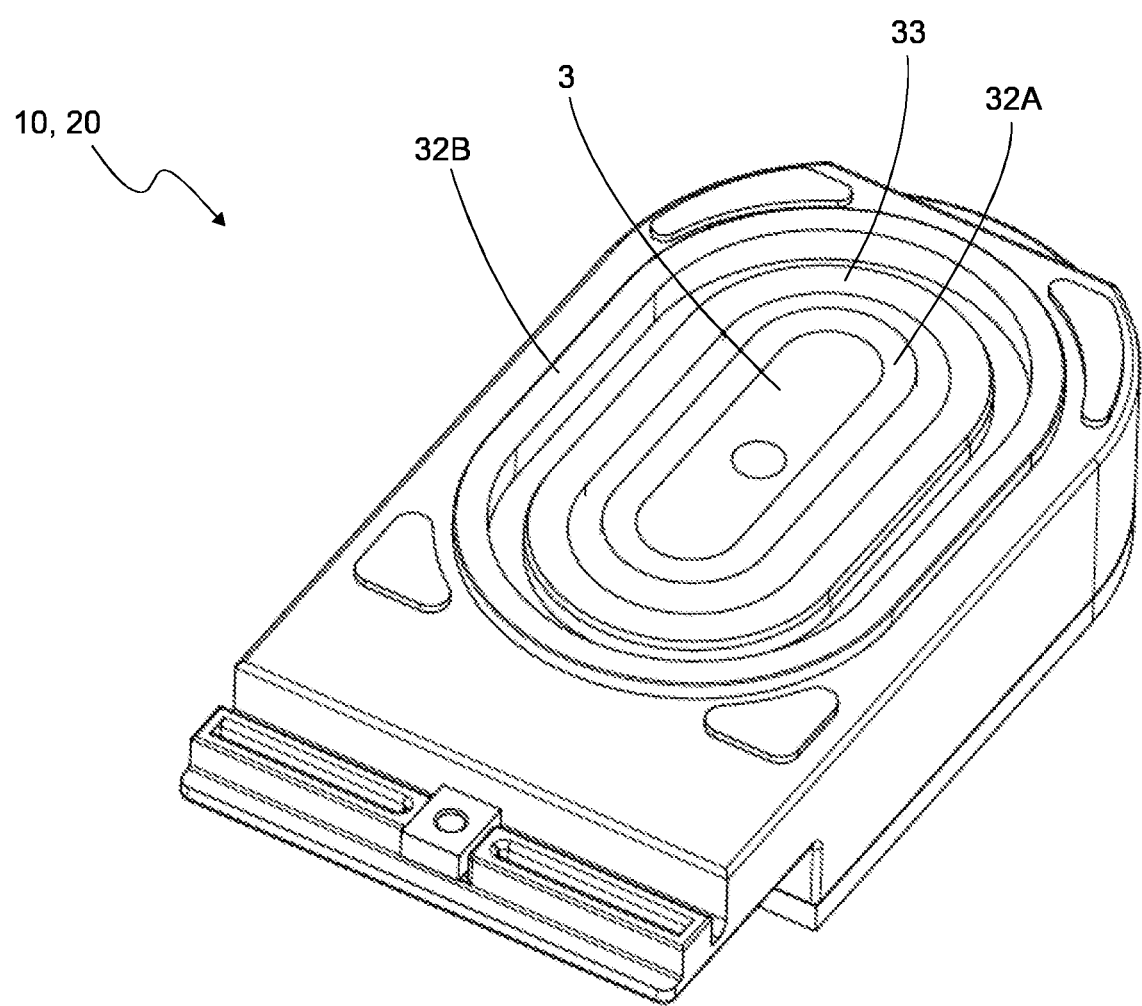

FIG. 12 shows a variation of the embodiment of FIG. 11. The fastening device here likewise comprises a first sealing section 32A which surrounds the suction region 3, and additionally to this a second sealing section 32B which surrounds the first sealing section 32A. Here, a lay-on section 33 is provided between the two sealing sections 32A, 32B. The lay-on section 33 surrounds the first sealing section 32A. The second sealing section 32B surrounds the lay-on section 33. Both sealing sections 32A, 32B and/or the lay-on section 33 by way of example have an elliptical course.

Figure 13:
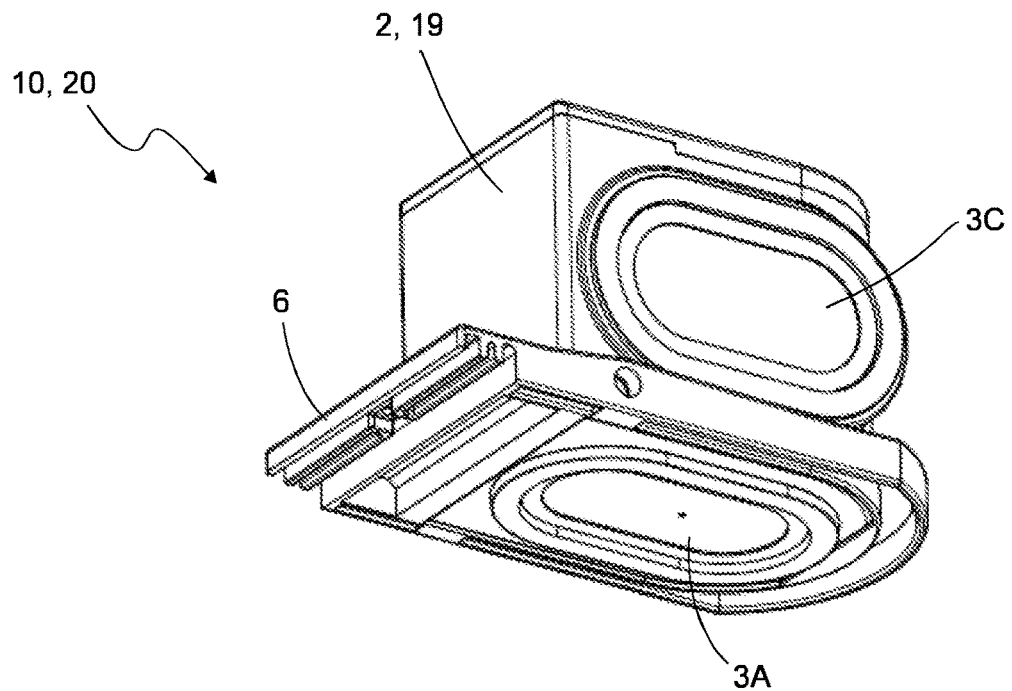
Figure 14:
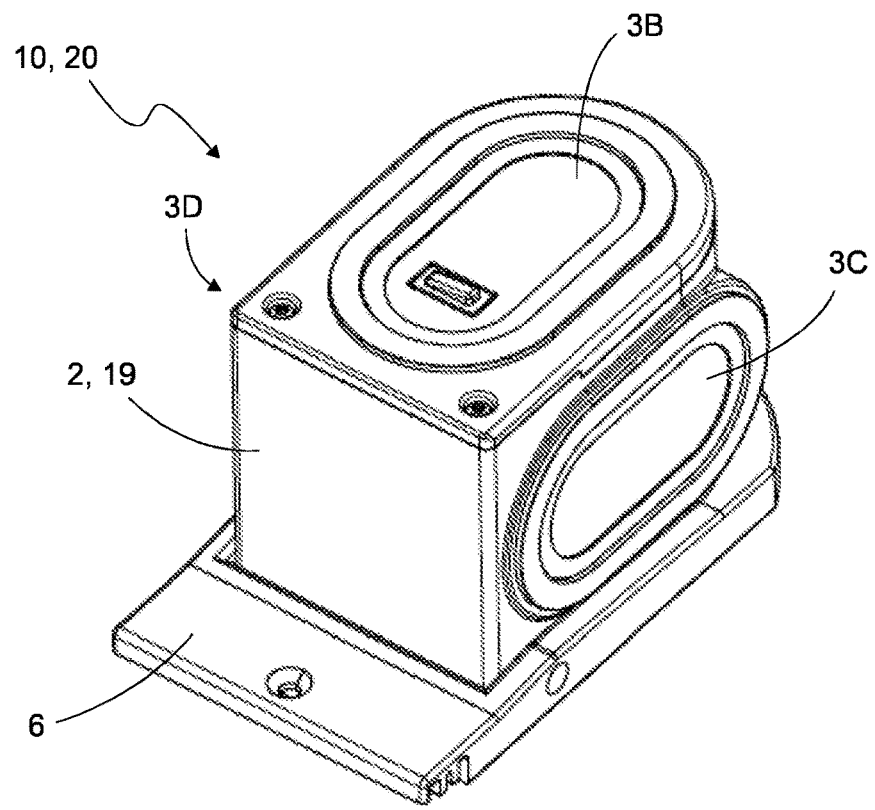

FIGS. 13 and 14 show an embodiment of the fastening device 10, concerning which the fastening device 10 comprises a plurality of suction regions 3A, 3B, 3C, 3D which are expediently arranged on different sides of the fastening device 10, in particular on different sides of the main section 19. By way of example, a first suction region 3A is arranged on the lower side of the fastening device 10, a second suction region 3B on the upper side of the fastening device 10, a third section region 3C on a first transverse side of the fastening device 10 and a fourth suction region 3D on a second transverse side of the fastening device 10. By way of example, each suction region 3A, 3B, 3C, 3D is surrounded by a respective sealing section.

The fastening device 10 is designed to subject each suction region 3A, 3B, 3C, 3D to a vacuum, in particular individually, in particular by way of the vacuum unit 4.

By way of example, the fastening section 6 is designed in a removable manner and can be expediently attached to each side of the mains section 19, at which a suction region 3A, 3B, 3C, 3D is located.

Figure 15:
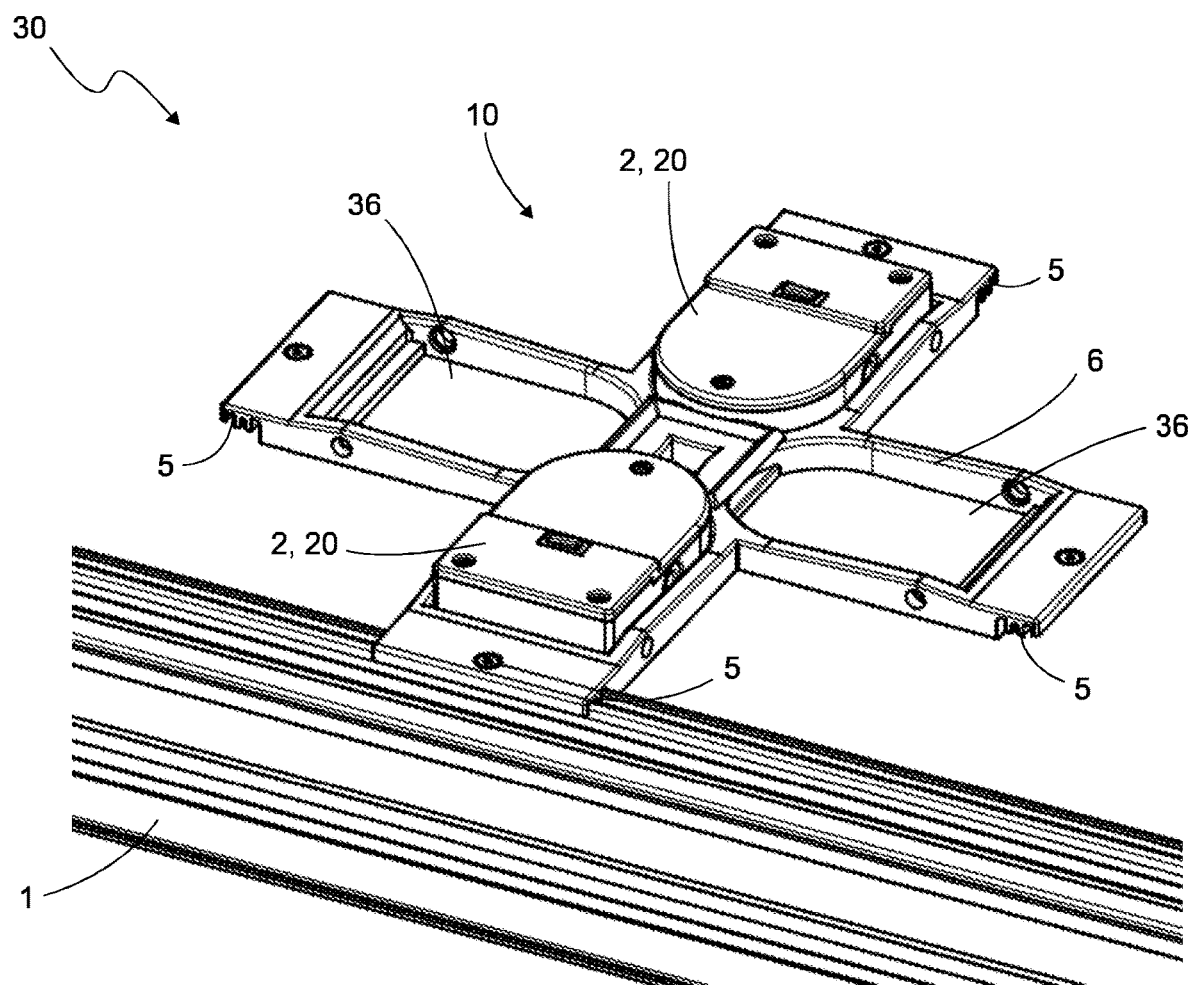

FIG. 15 shows a fastening device 10 which comprises a plurality of fastening units 20. Expediently, each fastening unit 20 comprises an individual housing 2, an individual suction region 3 and an individual vacuum unit 4. In particular, each fastening unit 20 is designed as a (explained above) fastening device without an individual fastening section 6—thus in particular as a main section 19.

The fastening units 20 are mechanically coupled to one another. By way of example, the fastening units 20 are mechanically coupled to one another via a common fastening section 6. The fastening section 6 by way of example is designed in a cross-like manner and comprises four fastening unit receiving regions, of which for example two are occupied. The fastening section 6 by way of example comprises four fastening interfaces 5. Each fastening interface 5 is arranged on a respective cross end of the fastening section 6.

According to a further embodiment, one of the fastening devices 10 which have been explained above comprises a communication unit, for example a wireless communication unit.

Expediently, a system of two or more of the aforementioned fastening devices 10 is provided. The fastening devices 10 are designed to communicate with one another via their communication units. In particular, the fastening devices 10 are designed to coordinate the provision of the vacuum via the communication via the communication units. By way of example, a first fastening device 10 is designed to send a communication signal to a second fastening device 10 on activating the vacuum unit 4 of the first fastening device 10, the effect of which being that the vacuum unit 4 of the second fastening device 10 is likewise activated. By way of example, the first fastening device 10 is further designed to send a communication signal to the second fastening device 10 on deactivating the vacuum unit 4 of the first fastening device 10, the effect of which being that the vacuum unit 4 of the second fastening device 10 is likewise deactivated. Concerning the two fastening devices 10, these are expediently autonomous, separate devices which have an individual housing 2.

According to a further possible embodiment, the fastening device 10 comprises an additional fastening interface for fastening a lamp. By way of example, an arrangement is provided, the arrangement comprising a fastening device 10 and a lamp, wherein the lamp is fastened to the additional fastening interface. The arrangement preferably further comprises a function unit 1, in particular guide rail which is fastened to the fastening interface 5 of the fastening device 10.

The invention claimed is:

1. An arrangement comprising a fastening device and a function unit, the fastening device comprising:
    a housing,
    a suction region for releasably fastening the fastening device to an underlay, wherein the suction region is arranged on the outside of the housing, and
    an electrically operated vacuum unit arranged in the housing, wherein the electrically operated vacuum unit is designed to provide a vacuum in the suction region, wherein
    the fastening device further comprises at least one fastening interface for fastening the function unit,
    wherein the function unit comprises a guide device comprising a guide structure defining a guide path.

2. The arrangement according to claim 1, wherein the fastening interface is oriented in the same direction as the suction region, so that by way of one lay-on movement of the fastening unit onto the underlay, the suction region is able to be placed onto the underlay and, simultaneously, the fastening interface is able to be placed onto the function unit.

3. The arrangement according to claim 1, wherein the fastening interface is designed to clamp the function unit between the fastening interface and the underlay, in a state in which the fastening device is fastened to the underlay.

4. The arrangement according to claim 1, wherein the fastening device further comprises an energy store and/or an energy store interface, for attaching an energy store.

5. The arrangement according to claim 1, wherein the fastening interface comprises a fastening mechanism, a slot nut, a toggle lever, an eccentric and/or a rotation lever.

6. The arrangement according to claim 1, wherein the fastening device further comprises a sealing and/or lay-on arrangement, wherein the sealing and/or lay-on arrangement comprises a lay-on section and a sealing section running around the lay-on section.

7. The arrangement according to claim 6, wherein the lay-on section and/or the sealing section is designed in an exchangeable manner.

8. The arrangement according to claim 6, wherein the fastening device further comprises a suction side, wherein the suction region is provided on the suction side, and wherein the sealing and/or lay-on arrangement defines a lay-on plane for the laying on the underlay.

9. The arrangement according to claim 8, wherein the lay-on plane is arranged at an angle with respect to the suction side.

10. The arrangement according to claim 6, wherein the sealing and/or lay-on arrangement comprises a pressure sensor membrane.

11. The arrangement according to claim 1, wherein the electrically operated vacuum unit is designed to provide two vacuum circuits.

12. The arrangement according to claim 11, wherein the suction region comprises at least two separate suction sections, wherein each suction section belongs to a respective vacuum circuit.

13. The arrangement according to claim 1, wherein the fastening device further comprises a venting valve for venting the suction region, and wherein the venting valve is coupled to an operating element.

14. The arrangement according to claim 1, wherein the fastening device is designed to carry out a closed-loop control of the vacuum.

15. The arrangement according to claim 1, wherein the fastening device is designed to detect an error state and to provide an error signal on the basis of the detected error state.

16. The arrangement according to claim 1, wherein the fastening interface is a first fastening interface and the fastening device further comprises a second fastening interface.

17. The arrangement according to claim 16, wherein the two fastening interfaces are arranged at different sides of the fastening device.

18. The arrangement according to claim 1, wherein the fastening device comprises a plurality of suction regions.

19. The arrangement according to claim 18, wherein the fastening device comprises a plurality of fastening units, wherein the fastening units are mechanically coupled to one another, and wherein each fastening unit provides one of the suction regions.

20. The arrangement according to claim 1, further comprising a communication unit.

21. The arrangement according to claim 19, wherein each fastening unit has an individual housing and/or an individual electrically operated vacuum unit.

22. The arrangement according to claim 1, wherein the guide device comprises a guide rail, a router guide, a milling template and/or a roll guide rail.

23. A fastening device, comprising:
a housing,
a suction region for releasably fastening the fastening device to an underlay, wherein the suction region is arranged on the outside of the housing at the outside, and
an electrically operated vacuum unit which is arranged in the housing and which is designed to provide a vacuum in the suction region,
wherein the fastening device further comprises a function unit, and the function unit comprises a guide device comprising a guide structure defining a guide path and/or a drilling device.

* * * * *